United States Patent [19]

Flanigen

[11] Patent Number: 4,765,458

[45] Date of Patent: Aug. 23, 1988

[54] ASBESTOS FREE HARDENED MONOLITHIC FILLER MASS

[75] Inventor: Edith M. Flanigen, White Plains, N.Y.

[73] Assignee: NI Industries, Inc., Long Beach, Calif.

[21] Appl. No.: 919,083

[22] Filed: Oct. 14, 1986

[51] Int. Cl.⁴ .................... F17C 11/00; B01J 20/10
[52] U.S. Cl. ........................ 206/0.7; 48/174; 220/88 R; 502/413
[58] Field of Search ............. 206/0.7; 220/88 R; 48/174, 179, 74; 106/119; 502/413; 62/48

[56] References Cited

U.S. PATENT DOCUMENTS

| | | | |
|---|---|---|---|
| 980,158 | 12/1910 | Kaiser | 206/0.7 |
| 1,175,607 | 3/1916 | Coleman | 502/413 |
| 1,419,746 | 6/1922 | Metzger | 206/0.7 |
| 1,675,083 | 6/1928 | Avery | 206/0.7 |
| 2,422,251 | 6/1947 | O'Brian et al. | 206/0.7 |
| 2,556,031 | 6/1951 | Dickey et al. | 106/119 |
| 2,883,040 | 4/1953 | Pater et al. | |
| 3,454,362 | 7/1969 | Spry | 264/29.2 |
| 3,816,149 | 6/1974 | Zettel | 106/120 |
| 3,902,913 | 9/1975 | Helser et al. | 106/119 |
| 4,179,303 | 12/1979 | Shannon | 106/119 |
| 4,349,463 | 9/1982 | Flanigen | |

FOREIGN PATENT DOCUMENTS 1401972 8/1975 United Kingdom .

Primary Examiner—Peter Kratz
Attorney, Agent, or Firm—Poms, Smith, Lande & Rose

[57] ABSTRACT

A calcium silicate filler mass for use in storing a gas solution or liquid gas, said filler mass having a high compressive strength and containing at least 0.5 weight percent reinforcing carbon fibers uniformly disposed within said calcium silicate, said filler having uniformly distributed throughout very fine pores of less than about 25 microns, and being substantially absent of voids and having a porosity of at least about 85%. There is also disclosed an acetylene storage vessel for storing gas solutions of acetylene which includes said silicate filler mass disposed within a metal shell and a method of forming said acetylene storage vessel.

18 Claims, 1 Drawing Sheet

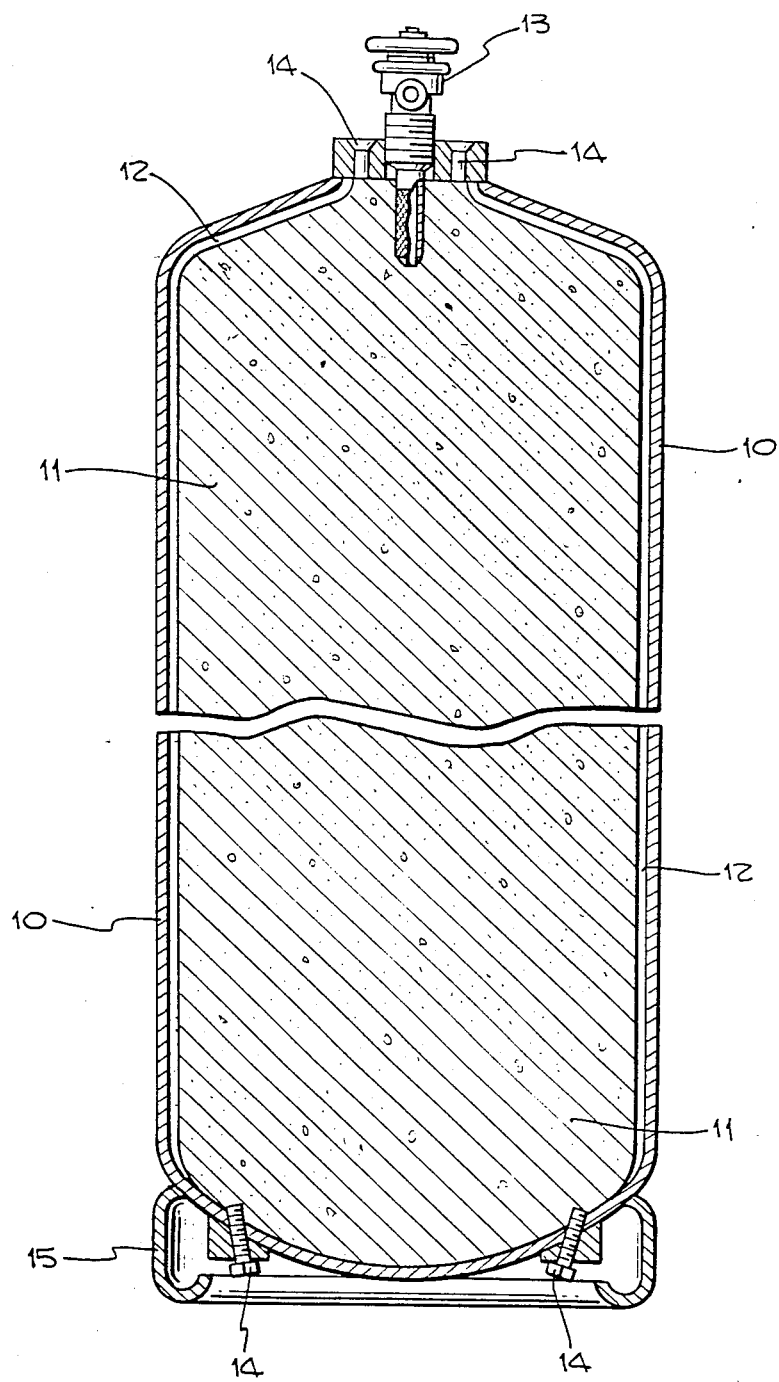

ASBESTOS FREE HARDENED MONOLITHIC FILLER MASS

BACKGROUND OF THE INVENTION

Many gases are typically stored as liquids, or dissolved in a solvent therefor. For example, nitrogen is normally stored as a liquid, whereas acetylene is normally stored by being dissolved in a solvent such as acetone. Both liquid gas and gas solutions are stored in a heat hardened and dried monolithic calcium silicate filler mass having very fine pores so as to provide a porosity of at least about 85% and, more desirably, at least about 88%. This means that 85% to 88% of the volume of calcium silicate mass comprises pores. This monolithic filler mass is formed in a metal shell and the pores of the monolithic filler mass are filled with either a liquid gas or a gas solution for storage and/or transporting. Typically, the porous monolithic filler mass is formed from an aqueous slurry of silica and quicklime (CaO), in the proportion of ten parts of lime (CaO) and 10 to 15 parts of silica ($SiO_2$). The aqueous slurry is poured into the metal shell and autoclaved at high temperatures and saturated steam pressure to form a hardened monolithic calcium silicate filler mass. The hardened calcium silicate filler means is then baked in an oven to drive the water from the hardened calcium silicate thereby obtaining a certain porosity and form the heat hardened and dried monolithic calcium silicate filler mass.

Two of the most important properties that a filler mass for storing liquid gases or gases dissolved in a solvent must possess are the porosity of the filler mass and the compressive strength of the mass. The porosity of the filler mass is important because the amount of porosity is directly related to the amount of gas which may be stored. A small increase in the porosity of a filler mass greatly increases the amount of gas which may be stored therein. In addition to the amount of porosity, the type of pores creating the porosity is also critical. In the case of an acetylene gas dissolved in a solvent such as acetone, the gas solution is stored in the pores of the monolithic heat hardened calcium silicate filler mass which, as noted, is located in a closed metal shell which is normally in the shape of cylinder. The pores in the filler mass must be disposed substantially, uniformly throughout the filler mass and are generally very fine, having a size of between 0.05 microns to about 25 microns.

In addition to porosity, another very important requirement of the hardened and dried monolithic filler mass is that it have a high compressive and tensile strength so that the storage vessel may withstand the rough handling it receives. For example, gas storage vessels are often dropped, which if the filler mass did not have a high compressive or tensile strength would cause structural failure or destruction of the filler mass. Such structural failure in the case of explosive gases, can be very dangerous. For example, such structural failures can result in large void spaces in the filler mass which could cause an explosion. In addition, such structural failure can clog the various fluid paths in the storage vessel with a buildup of pressure which can also cause an explosion.

Therefore, persons in the art have made numerous attempts to increase the structural strength and at the same time maintain or increase the porosity of the calcium silicate monolithic filler mass. For example, the prior art has added asbestos fibers to the calcium silicate filler mass in order to increase the structural strength of the filler mass and at the same time, maintain the other desirable and necessary properties of the calcium filler mass. See for example U.S. Pat. No. 2,883,040. In general, such filler masses which have anywhere from 10 weight percent to 20 weight percent asbestos fibers uniformly dispersed throughout the calcium silicate filler mass have performed satisfactorily. However, though the porosity of such silicate filler masses has been satisfactory, the compressive strength is not as high as the art would like and, in addition, in recent times it has been shown that asbestos may be dangerous to a person's health. Therefore, experiments have been conducted in an attempt to utilize fibers other than asbestos. For the most part, such experiments were unsuccessful because producing an acceptable silicate monolithic filler mass is a "black art", and it is impossible to predict whether a given fiber can produce a calcium filler mass having all the properties necessary to have a safe and effective storage vessel for liquid gases or gas solutions. Thus, it is a very difficult and time consuming task to evaluate fibers to determine if the inclusion of such fibers in a calcium silicate filler mass would produce an adequate filler mass.

After much time and effort, it was determined that alkali resistant glass fibers can be uniformly dispersed throughout a monolithic calcium silicate filler mass to produce an acceptable storage vessel for storing liquid gases and gases in solutions (see for example U.S. Pat. No. 4,349,463). However, the filler mass disclosed in this patent, even though being satisfactory, still could be improved in its porosity and structural strength. In this regard, it is noted, that in general, the amount of porosity, (i.e., the percent of the volume of the calcium silicate mass which is composed of pores) is generally determined by the amount of water used in preparation of the slurry and then driven off during the autoclaving step and baking step. However, to some extent, the porosity is also determined by the fibers utilized in increasing the structural strength of the filler mass.

As noted before, void spaces within the storage vessel must not be present in order to avoid the danger of explosion due to acetylene gas decomposition in these void spaces because of fire and/or flashback. It is therefore very important that the closed metal shell, (e.g., a metal cylinder) be substantially completely filled with the filler mass. In general, it can be said that the overall clearance between the metal shell and monolithic calcium filler mass must not exceed ½ of 1% of the respective diameter or length, but in no case to exceed ⅛ inch measured diametrically and longitudinally. The art has generally recognized that for safety considerations there should not be more than ⅛ of an inch between the calcium silicate filler mass and the metal shell. In normal practice, in producing storage vessels for liquid gases and gases in solution, an aqueous slurry of silica and quicklime (calcium oxide) is placed in the metal shell and then autoclaved and dried to form the monolithic filler mass within the shell. Since, as noted above, clearance between the shell and filler mass should not be greater than ⅛ of an inch, it is very important that during the hardening and drying, the filler mass should not appreciably shrink. Thus, any fibers utilized to increase the structural strength of the monolithic filler mass should cause very little shrinkage of the filler mass during autoclaving and heating. However, during autoclaving and heating there can be some minimal shrinkage. The reason for this is that it is desirable to have some clearance between the filler mass and metal shell in order to enhance gas discharge characteristics of the storage vessel. However, in general, it is thought that the less shrinkage the better.

In addition to the foregoing requirements of a hardened monolithic calcium silicate filler mass, the filler mass should also have at least 50 weight percent of crystalline phase (based on the weight of the calcium solicate) and preferably at least 65 or 75 weight percent crystalline phase. This is important in order to have good compressive strengths and also to reduce shrinkage at the high temperatures utilized in producing the filler mass. Therefore, the use of a fiber for increasing the compressive strength should not adversely affect the formation of a crystalline phase. In this regard, it is noted that in general during the autoclaving and the baking of the filler mass, there are various crystalline phases formed. These crystalline phases are tobermorite, xonotlite and quartz. There is also formed an amorphous phase which should be minimized as much as possible.

SUMMARY OF THE INVENTION

It is therefore an object of the present invention to provide an asbestos free, porous, heat hardened and substantially dried monolithic calcium silicate filler mass for use in storing a gas solution or a liquid gas, said filler having uniformly distributed throughout very fine pores of less than about 25 microns, having a porosity of at least about 85% to 88% and preferably at least 90 vol. % and when said filler is hardened and dried, it has very little shrinkage and has very high compressive strength.

It is a further object of the present invention to provide an acetylene storage vessel having a metal shell and, disposed therein, an asbestos free heat hardened monolithic silicate filler having very fine pores with no substantial voids in said filler, or in said storage vessel.

It is still a further object of the present invention, to disclose and provide an acetylene storage vessel for storing gas solutions of acetylene, said storage vessel including a metal shell and having disposed therein an asbestos free, porous, heat hardened and dried monolithic calcium silicate filler mass, the clearance between said metal shell and said filler mass being less than about ⅛ of an inch.

It is a further object of the present invention to provide an acetylene storage vessel with a metal shell and an asbestos free, porous, heat hardened and dried monolithic calcium silicate filler mass, the filler mass being composed of at least 50 weight percent crystalline phase (based on the weight of the calcium silicate), having very fine pores distributed throughout but substantially absent of voids, very high compressive strength and good gas filling and gas discharge characteristics.

It is still a further object of the present invention to provide a method for producing both a storage vessel for gas solutions and liquid gases and a filler mass for storing same, wherein the filler mass is formed by autoclaving under saturated steam pressures an aqueous slurry of silicate and calcium oxide, and then drying same to remove substantially all the moisture.

These and other objects of the present invention are accomplished by uniformly distributing throughout the calcium filler mass carbon fibers in an amount of at least about 0.5 weight percent based on the weight of the filler means.

In order to more fully understand the invention, the following detailed description of the preferred embodiments is given wherein all parts are by weight, unless otherwise stated, and all temperatures are in Fahrenheit, unless specifically stated otherwise.

DESCRIPTION OF THE DRAWING

The single FIGURE of the drawing is a cross section schematic of a storage vessel for storing gas solutions and liquid gases, the filler of said storage vessel having an asbestos free, porous, heat hardened and dried monolithic calcium silicate filler mass having uniformly distributed throughout carbon fibers.

DESCRIPTION OF THE PREFERRED EMBODIMENTS

Referring now to the single figure in the drawing, a storage vessel for storing gas solutions and liquid gases is shown which comprises a metal shell 10, which in the preferred exemplary embodiment, has a cylinder shape forming an enclosure which is substantially filled with an asbestos free, porous, heat hardened and dried monolithic calcium silicate filler mass 11. Between the sides of the metal shell 10 and the filler mass 11, there is a clearance space 12 which is slightly less than ⅛ of an inch. The metal shell is also provided with a valve 13, fuse plugs 14, and a foot ring 15.

The asbestos free, porous, heat hardened monolithic calcium silicate filler mass has at least 50 weight percent crystalline phase and preferably at least 65 or 75 weight percent. In addition, the filler mass has at least 85 to 88% porosity, and even more desirably, at least about 90% porosity which is provided for by having uniformly distributed throughout the filler mass very fine pores having a size of about 0.05 to about 25 microns and preferably from 0.5 to 5 microns. The filler mass 11 has very little amorphous phase, at least less than about 25 weight percent.

The crystalline phase of the filler mass will be about at least 50% weight percent and preferably will be predominately xonotlite and tobermorite. Preferably there is no quartz crystalline phase in the filler mass, although this is not particularly important and may range to as high as 10 or 20 weight percent. Most importantly, the filler mass 11 will contain from about 0.5 weight percent to as high as 20 weight percent carbon fibers which provide high compressive and tensile strengths and low shrinkages while maintaining high porosity of the filler mass. For example, the filler mass may have a porosity of about 85% to as high as 95% with the preferred range being somewhere between 88 and 92%. Such high porosity coupled with high compressive strength is very desirable, since this increases the amount of gas which can be stored in the vessel, and at the same time, allows for rough handling of the vessel without breaking. Normally, increased porosity leads to less compressive strength of the filler mass. In this regard it should be noted, that compressive strength is the most important property from a structural standpoint. Flexural structural strength is not as important due to the fact that the filler mass is normally enclosed within a relatively strong metal shell which, in the preferred exemplary embodiment is in the shape of a cylinder.

The carbon fibers of the present invention preferably have high strength, the length and diameter not being particularly critical. The length of the carbon fibers employed in the present invention may vary widely to suit present requirements; typical lengths being about ⅛ and 3 inches with the preferred range being ¼ inch and 1 inch. The thickness of the fibers may also vary widely, but in general it may be said that the thickness will be between about 5 microns to about 25 or 50 microns with the preferred range being between about 7 and 10 microns. The carbon fibers are available for many sources and in many forms (e.g., matt form). Generally, one may obtain almost any length of fiber desired as well as obtaining the desired diameter. Refractory carbon fibers having high tensel strength shown in U.S. Pat. No. 3,454,362 are suitable for use in the present invention.

Manufacturing calcium silicate filler masses having uniformly dispersed therein carbon fibers, and the storage vessel of the present invention may be accomplished by compounding an aqueous slurry of quicklime (CaO) and silica ($SiO_2$). The CaO to $SiO_2$ weight ratio may vary widely, but satisfactory products are made if the range is about 0.6 to 1.0; preferably the range being about 0.8 to 1.0.

Slaked line [$Ca(OH)_2$] can be used in lieu of quicklime. If slaked lime is used, the amount of $Ca(OH)_2$ is equivalent to the amount of CaO set forth above in order to obtain the necessary CaO to $SiO_2$ ratios. Of course, if quicklime per se is used, a small amount of water will be used to slak the quicklime. The amount of water utilized will vary depending upon the porosity desired. In general, the water volume is such that the porosity of 88% or more is obtained (preferably from about 88% to 92%). In order to obtain a calcium silicate filler mass having between about 0.5 weight percent and about 20 weight percent, there should be added to the aqueous slurry this amount of carbon fiber based on the solids in the slurry. Most preferably, the carbon fiber content of the aqueous slurry should be between about 1 weight percent to 10 weight percent (the upper limit being based primarily upon economic considerations).

The silica used to produce the slurry is preferably finely ground silica having a particle size of less than 300 mesh. However, the particle size may vary depending upon the type of silica used and the particular end product desired.

The production of an aqueous slurry to produce the monolithic calcium silicate filler mass is, in general, known in the art and may be accomplished by slacking quicklime in water (6.5 to 10.5 pounds of water per pound of lime) at an elevated temperature. To the slaked lime there is then added silica and a matt of carbon fibers having a diameter of between 7 and 9 microns. It should be noted that it is not necessary to predisperse the carbon fibers in water prior to their addition to the aqueous slurry as is the case with asbestos fibers. The slurry is stirred to uniformly disperse the carbon fibers throughout the slurry, and the cooled slurry is introduced into the metal shell so as to substantially fill this shell. It is important that no voids or air pockets are in the slurry at this time.

The slurry is then autoclaved in the metal shell. For autoclaving, the metal shell is provided with an autoclave fitting such as a pressure relief valve and filter in lieu of the valve 13 shown in the drawing. The storage vessel filled with the slurry composition is then placed in an oven and autoclaved at saturated steam pressure and an elevated temperature which is preferably at least about 250 degrees, and more preferably between about 360° F. and about 450° F. The time of autoclaving may vary, but in general it is about 20 hours to 60 hours, and is dependant on the size of the vessel; the larger the vessel, the longer the time necessary. After autoclaving, the vessel is allowed to cool to room temperature, and the autoclaving fitting removed. Thereafter, the vessel is placed in an oven to dry. The drying temperature is not particularly critical and may vary between 200° F. and 1,000° F.

Generally speaking, the drying or baking is first done at a temperature of about 230° F. for about 2 hours and thereafter the temperature is raised to between 400° F. and 700° F. for about 30 hours. After the storage vessel is cooled, the liquid gas or gas solution is charged to the vessel.

In order to more fully illustrate the present invention, the following examples are given below in which all parts are by weight listed (unless stated otherwise) and all temperatures are given in degrees Fahrenheit. In each of the following examples, quiklime and silica (as quartz flour) was utilized, the weight ratio of CaO to $SiO_2$ being 0.8. A sufficient amount of water was utilized in each example so as to have 91 volume percent water present based on the volume of solids utilized (the weight amount of water varied in each example from 8 pounds to 9 pounds per pound of lime).

EXAMPLE I

In this example there is exemplified the use of asbestos fibers as a reinforcing agent in order to compare the properties thereof with the present invention.

The lime was slaked in 60-65% of the total volume of water and 10% by weight of asbestos fiber (based on the total weight of quicklime, silica and asbestos) was dispersed in the remaining portion of the water. The silica and the asbestos fiber, together with the remaining part of the water, were then added to the slaked lime and the entire aqueous slurry mixed. The thus formed aqueous slurry containing asbestos, lime and silica is then pored into a reactor, then sealed and autoclaved at a temperature of 400° F. for 16 hours under saturated steam pressure. After 16 hours, the reactor was cooled to ambient temperature, opened and the hardened monolithic calcium silicate filler mass having uniformly dispersed therein asbestos was baked at 230° F. for two hours followed by baking at 590° F. for 118 hours.

The thus formed calcium silicate filler mass has the following properties listed in Table I.

TABLE I

| | |
|---|---|
| Shrinkage (%) Length | 0.07 |
| Shrinkage (%) Diameter | 0.12 |
| Compressive Strength (psi) | 386 |
| Porosity (Vol. %) | 90.5 |
| Pore size (microns) | 0.53 |
| Crystalline Phase (Wt. %) | 66 |

EXAMPLE II

In this example, a monolithic porous heat hardened calcium silicate filler was made using 2 weight percent alkali resistant glass fibers disclosed in U.S. Pat. No. 4,349,643. The alkali resistant glass fibers used contained about ½ weight percent zirconium. Lime was slaked as set forth in Example 1 but the entire amount of water was used because no prior dispersing of the alkali resistant glass fiber was necessary. Thereafter, the procedures for Example 1 were used in that to the slaked lime and water was added the silica and alkali resistant fiber which was in choped form, having a length of about 1 to 2 inches. The properties of the thus formed porous filler mass were as set forth in Table II.

TABLE II

| | |
|---|---|
| Shrinkage (%) Length | 0.08 |
| Shrinkage (%) Diameter | 0.11 |
| Compressive Strength (psi) | 477 |
| Porosity (Vol. %) | 89.6 |
| Pore size (microns) | 0.53 |
| Crystalline Phase (Wt. %) | 89 |

EXAMPLE III

In this example there is produced a monolithic porous heat hardened calcium silicate filler mass containing uniformly dispersed therein 2 weight percent carbon in accordance with the present invention. The carbon fibers were Thornel, carbon matt having a length of about ⅛ inch and a diameter of between about 7 and 9 microns. The procedure was identical to Example II and the properties were set forth in Table III.

TABLE III

| | |
|---|---|
| Shrinkage (%) Length | 0.01 |
| Shrinkage (%) Diameter | 0.05 |
| Compressive Strength (psi) | 499 |
| Porosity (Vol. %) | 90 |
| Pore size (microns) | 0.57 |
| Crystalline Phase (Wt. %) | 77 |

As shown in a comparison of the properties, the shrinkage characteristics are better with carbon and the compressive strength of the porous filler mass made with carbon is better than with either asbestos or alkali resistant glass fibers. The porosity of three filler masses were satisfactory.

I claim:

1. An asbestos free, porous, heat hardened and dried monolithic calcium silicate filler mass for use in storing a gas solution or liquid gas, said filler mass comprising at least about 0.5 weight percent reinforcing refractory carbon fibers uniformly distributed within said calcium silicate, said filler having uniformly distributed throughout very fine pores of less than about 25 microns, and being substantially absent of voids, and a porosity of at least about 85 percent.

2. An asbestos free, porous, heat hardened and dried monolithic calcium silicate filler mass according to claim 1 wherein calcium silicate filler mass contains between about 0.5 weight percent and 20 weight percent reinforcing refractory carbon fibers.

3. An asbestos free, porous, heat hardened and dried monolithic calcium silicate filler mass according to claim 1 wherein said filler mass has at least about 50 weight percent crystalline phase based on the weight of the calcium silicate.

4. An asbestos free, porous, heat hardened and dried monolithic calcium silicate filler mass according to claim 1 wherein said refractory carbon reinforcing fibers have a length of between about ⅛ inch and about 3 inches.

5. An asbestos free, porous, heat hardened monolithic calcium silicate filler mass according to claim 4, wherein the diameter of said refractory carbon reinforcing fibers is between about 5 microns and 50 microns.

6. An asbestos free, porous, heat hardened monolithic calcium silicate filler mass according to claim 1, wherein said filler mass has a porosity of at least 90%.

7. An acetylene storage vessel for storing gas solutions of acetylene, said storage vessel comprising a metal shell having uniformly distributed therein an asbestos free, porous, heat hardened and dried monolithic calcium silicate filler mass, the clearance between said metal shell and said filler mass being less than about ⅛ inch, said calcium silicate filler mass having at least about 0.5 weight percent reinforcing refractory carbon fibers uniformly disposed in said filler mass, said filler mass having uniformly distributed throughout very fine pores of less than about 25 microns and having a porosity of at least about 85 volume percent and containing substantially no voids.

8. An acetylene storage vessel according to claim 1 wherein said filler mass contains about 0.5 weight percent to about 20 weight percent refractory carbon fibers.

9. An acetylene storage vessel according to claim 7 wherein said calcium silicate filler mass has 50 weight percent of crystalline phase.

10. An acetylene storage vessel according to claim 7 wherein said reinforcing refractory carbon fibers have a length of about ⅛ inch and 3 inches.

11. An acetylene storage vessel according to claim 10 wherein said refractory carbon reinforcing fibers have a diameter of about 5 microns and 50 microns.

12. An acetylene storage vessel according to claim 7 wherein said calcium silicate filler mass has a porosity of at least about 90 volume percent.

13. A method of forming an acetylene storage vessel having disposed therein an asbestos free, porous, heat hardened, monolithic calcium silicate filler mass comprising:
 (a) providing an asbestos free aqueous slurry comprising at least about 85 percent volume water, CaO and SiO$_2$ wherein the weight ratio of CaO to SiO$_2$ is about 0.6 to about 1.0, and having uniformly dispersed in the aqueous slurry at least about 0.5 weight percent, based on the solids in said slurry, of refractor carbon fibers;
 (b) pouring said asbestos free aqueous slurry composition into a metal shell so as to substantially fill said metal shell;
 (c) autoclaving said slurry in said metal shell at saturated steam pressure to produce an asbestos free calcium silicate filler means;
 (d) baking said calcium silicate filler mass in said metal shell to form in said calcium silicate filler mass uniformly distributed very fine pores of less than about 25 microns and having a porosity of at least about 85 volume percent, the clearance between said metal shell and said asbestos free, porous, heat hardened and dried monolithic calcium silicate filler mass being less than about ⅛ inch.

14. A method according to claim 13, wherein said refractory carbon fiber are present in said calcium silicate filler mass in amount of about 0.5 weight percent and 20 weight percent.

15. A method according to claim 13, wherein said calcium silicate filler mass has a crystalline phase of about 50 weight percent.

16. A method according to claim 13, wherein said refractory carbon fibers have a length of about ⅛ inch and about 3 inches.

17. A method according to claim 16, wherein said refractory carbon fibers have a diameter of about 5 microns and about 50 microns.

18. A method according to claim 13, wherein said calcium silicate filler mass has a porosity of about 90 volume percent.

* * * * *